(12) United States Patent
Iwasaki et al.

(10) Patent No.: US 6,597,268 B2
(45) Date of Patent: Jul. 22, 2003

(54) ELECTROMAGNETIC DEVICE AND CIRCUIT FOR DRIVING THE SAME

(75) Inventors: Gunchu Iwasaki, Soka (JP); Kenta Namioka, Yokohama (JP)

(73) Assignee: Japan A.C.R. Co., Ltd., Koshigaya (JP)

(*) Notice: Subject to any disclaimer, the term of this patent is extended or adjusted under 35 U.S.C. 154(b) by 0 days.

(21) Appl. No.: 09/817,130

(22) Filed: Mar. 27, 2001

(65) Prior Publication Data

US 2001/0028290 A1 Oct. 11, 2001

Related U.S. Application Data

(63) Continuation of application No. PCT/JP00/02346, filed on Apr. 11, 2000.

(30) Foreign Application Priority Data

Jul. 27, 1999 (JP) .......................................... 11-212533

(51) Int. Cl.[7] ................................................ H01F 7/10
(52) U.S. Cl. ..................................... 335/252; 381/418
(58) Field of Search .......................... 335/252, 220–231, 335/235, 244, 78–86, 124, 128; 381/418

(56) References Cited

U.S. PATENT DOCUMENTS 2,152,955 A * 4/1939 Coyne ........................ 335/252
4,914,410 A * 4/1990 Diem et al. ................... 335/80
6,229,417 B1 * 5/2001 Hannula ..................... 335/132

FOREIGN PATENT DOCUMENTS

| JP | 57-110377 | 7/1982 |
| JP | 4-275046 | 9/1992 |
| JP | 5-191334 | 7/1993 |
| JP | 11-76939 | 3/1999 |

* cited by examiner

Primary Examiner—Lincoln Donovan
(74) Attorney, Agent, or Firm—Pillsbury Winthrop LLP

(57) ABSTRACT

An electromagnetic device is provided with a coil bobbin (1) supporting an excitation coil (5) and a U-shaped movable iron piece (2) whose one side (2a) is inserted in and fixed to a hollow section (1a) of the coil bobbin (1) in a state where it is held between a pair of iron cores (3) and (4). A remaining side (2b) of the U-shaped movable iron piece (2) is inserted in a through-hole section (1c) of the coil bobbin (1) and has a resilient characteristic that it is spaced away from the one side (2a). The top surface of each of rising sections (3a) and (3b) of the iron cores (3) and (4) is configured by bending the end of each of the rising sections (3a) and (3b) and is located to be opposite to the top of the remaining side (2b) at a preset distance away.

12 Claims, 7 Drawing Sheets

ELECTROMAGNETIC DEVICE AND CIRCUIT FOR DRIVING THE SAME

RELATED APPLICATIONS

This application is based upon and claims the benefit of priority from the prior Japanese Patent Application No. 11-212533, filed Jul. 27, 1999. This is a Continuation Application of PCT Application No. PCT/JP00/02346, filed Apr. 11, 2000.

TECHNICAL FIELD

This invention relates to an electromagnetic device suitable for a microminiature oscillator or switching device and to a circuit for driving the electromagnetic device.

BACKGROUND ART

In recent years, portable telephones have been surprisingly popularized, and those designed to inform users of the ringing of telephones through oscillations have been chiefly used for the extension of user strata and the convenience of users. Such a portable telephone is constructed so that an eccentric weight is attached to the main shaft of a motor housed in a telephone body and is rotated by the rotation of the motor driven simultaneously with the reception of a call signal, and a difference in position between the main shaft and the eccentric weight is converted into an oscillation to transmit this oscillation to a user.

For the portable telephone of this type, a coreless-type motor is usually used (refer to, for example, Japanese Patent Preliminary Publication No. Hei 4-275046). This motor, however, not only is complicated in structure and high in cost, but also causes a forced rotation because it is used in a state where the eccentric weight is attached to a motor shaft. Hence, one-sided wear of bearings and the deformation of a rotary shaft are produced, raising the problem of impairing durability. Furthermore, since a space sufficient to turn the weight must be provided, a relatively large space is required for an oscillation generator. This makes it difficult to achieve compactness of the device. In addition, there is a disadvantage even when the effective utilization of electric power is considered.

A system constructed so that a pulse motor is incorporated and an oscillation pattern can be selected to securely call a mate intended when necessary, is proposed (refer to, for example, Japanese Patent Preliminary Publication No. Hei 5-191334). However, this system has the same problem as in the above case.

It is, therefore, an object of the present invention to provide an electromagnetic device which not only can be manufactured in small size and at a low cost and guarantees high reliability of operation and durability, but also is capable of effectively utilizing electric power and is suitable for an oscillator, and a circuit for driving the electromagnetic device.

DISCLOSURE OF THE INVENTION

The electromagnetic device according to the present invention is provided with a coil bobbin supporting an excitation coil and a U-shaped movable iron piece constructed of a soft magnetic material to have a resilient characteristic that when one side thereof is inserted in and fixed to the coil bobbin in the direction of the axis of the excitation coil, the other side thereof is spaced away from the one side. The other side of the movable iron piece is held to be displaceable against its resilient force by the coil bobbin so that the end of the one side of the movable iron piece is opposite to the end of the other side at a predetermined distance away.

Further, the electromagnetic, device according to the present invention is provided with a coil bobbin supporting an excitation coil; a U-shaped movable iron piece constructed of a soft magnetic material to have a resilient characteristic that when one side thereof is inserted in and fixed to the coil bobbin in the direction of the axis of the excitation coil, the other side thereof is spaced away from the one side; a leaf spring whose base is fastened to the other side of the movable iron piece and whose top extends beyond the end of the other side; and a weight fastened to the top of the leaf spring. The other side of the movable iron piece is held to be displaceable against its resilient force by the coil bobbin so that the end of the one side of the movable iron piece is opposite to the end of the other side at a predetermined distance away.

Still further, the electromagnetic device according to the present invention is provided with a coil bobbin supporting an excitation coil; a U-shaped movable iron piece constructed of a soft magnetic material so that one side thereof is inserted in and fixed to the coil bobbin in the direction of the axis of the excitation coil, while the other side thereof is opposite to the one side at a predetermined distance away; and a U-shaped leaf spring provided along the movable iron piece to have a resilient characteristic that when one side thereof is inserted in and fixed to the coil bobbin in the direction of the axis of the excitation coil, the other side thereof is spaced away from the one side. The other side of the leaf spring is held by the coil bobbin to be displaceable, together with the movable iron piece, against its resilient force.

The electromagnetic device of the present invention is provided with a coil bobbin supporting an excitation coil; a U-shaped movable iron piece constructed of a soft magnetic material, engaging with the coil bobbin to be displaceable so that one side thereof is inserted in and fixed to the coil bobbin in the direction of the axis of the excitation coil, while the other side thereof is opposite to the one side at a predetermined distance away; and a resilient member interposed between the opposite sides of the movable iron piece, pressing the opposite sides so that they are spaced away from each other.

According to the present invention, the top of at least one of the opposite sides of the movable iron piece is bent toward the other so that a flux linkage is increased, or an iron piece is fastened to at least one of the opposite sides and is configured to project toward the other so that the flux linkage is increased.

According to the present invention, the electromagnetic device is further provided with an iron core inserted in and fixed to the coil bobbin in the direction of the axis of the excitation coil, having a rising section engaged with the top of one side of the movable iron piece and bent toward the other side so that a flux linkage is increased.

According to the present invention, the electromagnetic device is still further provided with a pair of iron cores inserted in and fixed to the coil bobbin so as to hold one side of the movable iron piece between the iron cores in the direction of the axis of the excitation coil, having a first rising section in which one of the iron cores is engaged with the top of one side of the movable iron piece and is bent toward the other side so that a flux linkage is increased and a second rising section in which the other is adjacent to the first rising section and is bent toward the other side so that the flux linkage is increased.

According to the present invention, the top surface of each of the first and second rising sections is configured by bending each rising section.

According to the present invention, a proper selection is made so that a magnetic path length governed by the U-shaped movable iron piece and the iron cores is 24–36 mm, the cross-sectional area of the movable iron piece is 1.2–3.2 mm$^2$, and the cross-sectional area of each of the iron cores is 2.4–3.6 mm$^2$.

The driving circuit of the electromagnetic device according to the present invention is constructed so that a series circuit including a normally open switch closed for a preset time by a call signal, a power supply, and a current-pulse circuit is connected in series with the excitation coil.

According to the present invention, an arithmetical unit is connected to the current-pulse circuit so that the arithmetical unit is capable of controlling at least one of the conduction time, conduction period, and conduction duration of a pulse current supplied from the current-pulse circuit to the excitation coil.

BEST MODE FOR CARRYING OUT THE INVENTION

Figure 1:
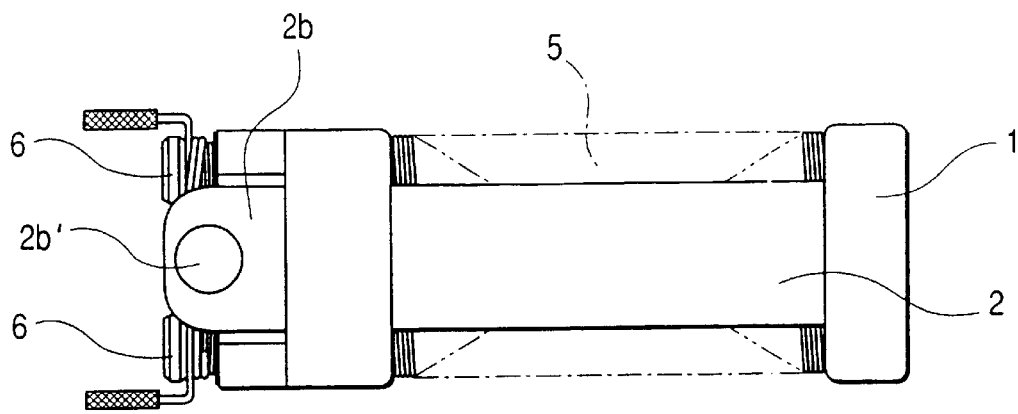
FIG. 1 is a plan view showing the structure of a first embodiment of the electromagnetic device according to the present invention.
Figure 2:
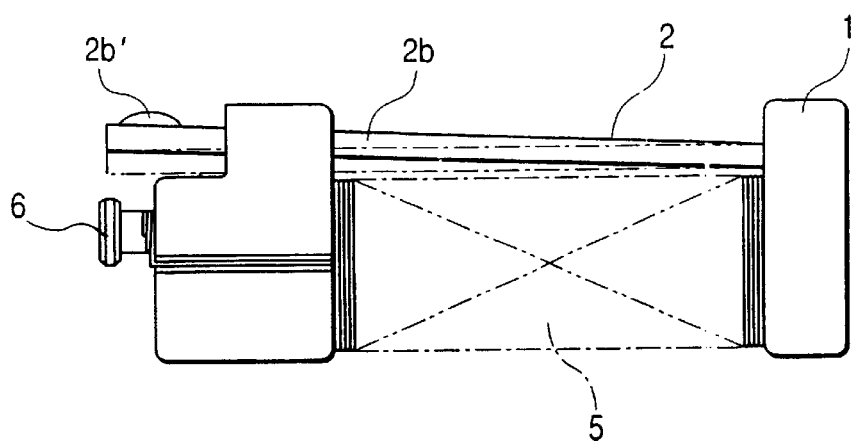
FIG. 2 is a side view showing the structure of the first embodiment.
Figure 3:
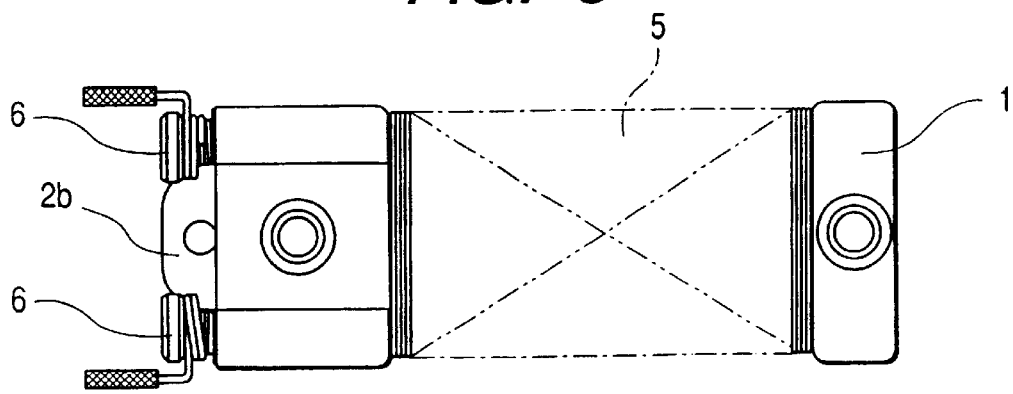
FIG. 3 is a bottom view showing the structure of the first embodiment.
Figure 4:
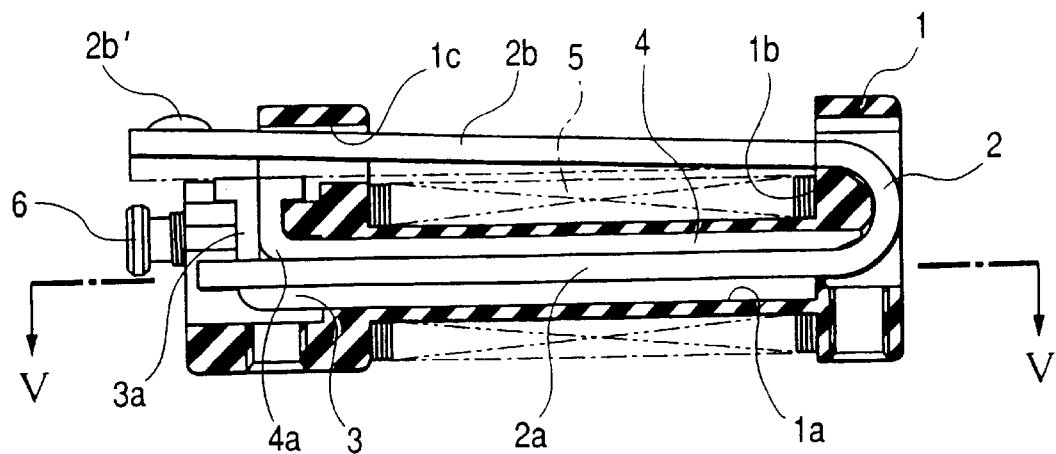
FIG. 4 is a longitudinal sectional view at the center, showing the structure of the first embodiment.
Figure 5:
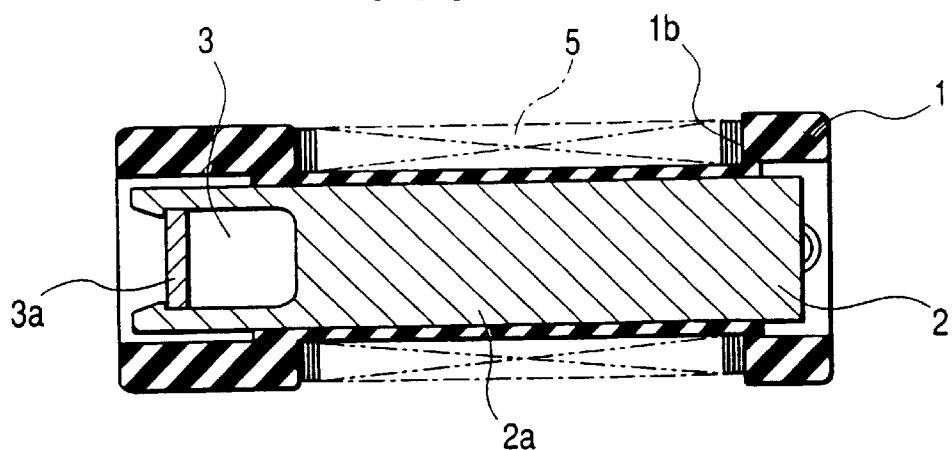
FIG. 5 is a sectional view taken along line V—V in FIG. 4.
Figure 6:
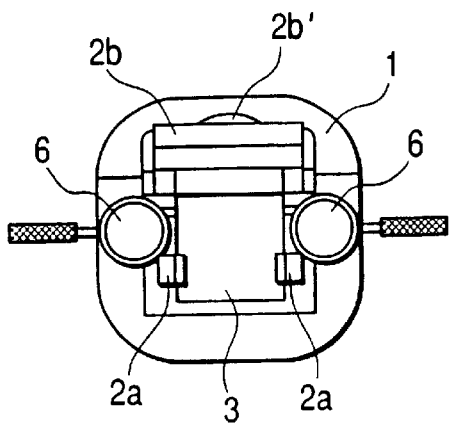
FIG. 6 is a left side view in FIG. 2.

In accordance with the embodiments shown in the drawings, various aspects of the present invention will be described below. In FIGS. 1 to 6, showing the first embodiment of the electromagnetic device according to the present invention, reference numeral 1 denotes a coil bobbin having a hollow section 1a whose both ends are opened, an excitation-coil mounting section 1b, and a through-hole section 1c; 2 denotes a movable iron piece in which a strip piece constructed of a soft magnetic material which is not subjected to magnetic annealing is bent into a U-shape so that one side 2a is inserted in the hollow section 1a of the coil bobbin 1 and a remaining side 2b is inserted in the through-hole section 1c of the coil bobbin 1 to have a resilient characteristic that both sides are spaced away from each other; 3 and 4 denote iron cores inserted in and fixed to the hollow section 1a of the coil bobbin 1, with the movable iron piece held between them, each constructed so that one end is bent to rise toward the remaining side 2b of the movable iron piece 2 and a top surface, as shown in FIG. 4, is configured to increase a flux linkage by bending the top of each of rising sections 3a and 4a; 5 denotes an excitation coil including an electric wire wound around the excitation-coil mounting section 1b of the coil bobbin 1; and 6 denotes connecting terminals screwed into the coil bobbin 1 in order to connect the excitation coil 5 to a power supply. In this case, the top of the one side 2a of the movable iron piece 2, as clearly shown in FIG. 5, is engaged with the base of the rising section 3a of the iron core 3 so that the movable iron piece 2 and the iron core 3 are not separated in the proximity of the rising section 3a. Furthermore, in a normal state, the remaining side 2b of the movable iron piece 2 is held by the upper wall of the through-hole section 1c of the coil bobbin 1 against its resilient force so that a preset distance between the remaining side 2b and the common top surface of the rising sections 3a and 4a of the iron cores 3 and 4 is maintained. In the case where the electromagnetic device is used as an oscillator that informs a user of the reception of the call signal of a portable telephone, a projection 2b' is configured at the top of the remaining side 2b of the movable iron piece 2.

Figure 7:
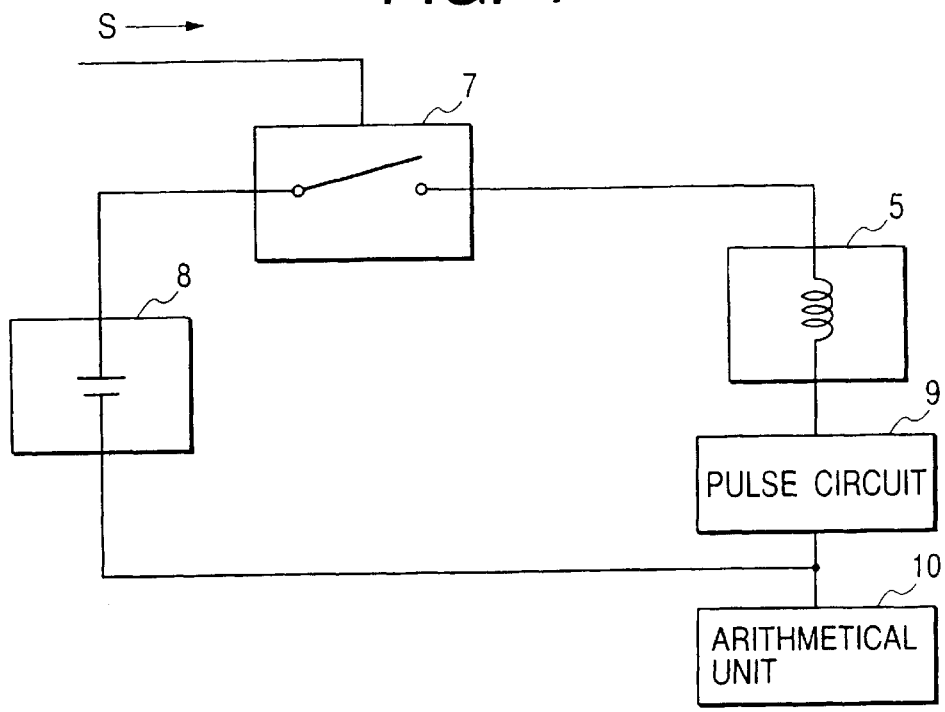
FIG. 7 is a diagram showing a circuit configuration of one example of a driving circuit used in the electromagnetic device according to the present invention.
Figure 8:
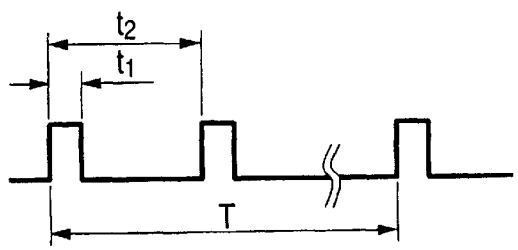
FIG. 8 is a diagram showing a pulse current supplied to an excitation coil.

The block diagram of FIG. 7 shows the basic configuration of the driving circuit used in the electromagnetic device. In this diagram, reference numeral 7 represents a normally open switch closed for a preset time when a call signal S is received, 8 represents a power cell, and 9 represents a current-pulse circuit configured so that an oscillation mode can be selected by an arithmetical unit 10, that is, so that at least one of a conduction time $t_1$, a conduction period $t_2$, and a conduction duration T (see FIG. 8) of a pulse current supplied to the excitation coil 5 of the electromagnetic device can be controlled. Also, where the electromagnetic device is used as the oscillator that informs a user of the call of a portable telephone, a CPU incorporated in the portable telephone can be used as the arithmetical unit 10.

Since the first embodiment is constructed as mentioned above, the oscillator informing a user of the call of the portable telephone is cited as an example, and its function will be described below. When the switch 7 is closed by the reception of the call signal S, a pulse current having the conduction time $t_1$, the conduction period $t_2$, and the conduction duration T which are set by the arithmetical unit 10 is supplied from the current-pulse circuit 9 to the excitation coil 5. In this way, when the excitation coil 5 is conducted, a magnetic flux is generated in a magnetic circuit constructed with the movable iron piece 2 and the iron cores 3 and 4. Moreover, an attractive force is produced in a direction that a magnetic space between the remaining side 2b of the movable iron piece 2 and the common top surface of the rising sections 3a and 4a of the iron cores 3 and 4 is reduced, that is, in a direction opposite to the resilient force of the remaining side 2b. Consequently, the remaining side 2b of the movable iron piece 2 is displaced as indicated by a chain line in FIG. 4. Thus, when the conduction of the excitation coil 5 is interrupted, the magnetic flux of the magnetic circuit is dissipated and the magnetic circuit is demagnetized. For this, the resilient force of the remaining side 2b of the movable iron piece 2 overcomes the attractive force of the magnetic circuit, and the remaining side 2b is displaced until it abuts on the upper wall of the through-hole section 1c of the coil bobbin 1 (until it reaches a position indicated by a solid line in FIG. 4). At this time, the projection 2b' strikes the wall, not shown, of the portable telephone. By repeating this conduction and interruption relative to the excitation coil 5, namely the displacement of the remaining side 2b of the movable iron piece 2, oscillation is generated to inform a user of the reception of the call signal.

In this case, an oscillation frequency is governed by the conduction time, conduction period, and conduction duration of the pulse current supplied to the excitation coil 5; the inductance of the excitation coil 5; the time constant of the driving circuit; the permeance of the magnetic space; and the resilient force, namely the spring constant, of the remaining side 2b of the movable iron piece 2. In practical use, therefore, the oscillation can be properly modulated by varying at least one of the conduction time, period, and duration of the pulse current through the arithmetical unit 10. The use of this function of modulation provides an application such that the oscillation informs the same mate of a normal call in distinction from an emergency call, thus further improving a call function. The first embodiment is constructed so that a plurality of iron cores are used and the attractive section of each of the iron cores can be adequately enlarged by bending the end of the iron core itself to increase the flux linkage and improve an attractive efficiency. The first embodiment is also constructed so that a proper spring constant (resilient force) is imparted to the remaining side 2b of the U-shaped movable iron piece 2 which can be relatively extended, and the movement of the remaining side 2b can be suppressed by a part (the upper wall of the through-hole section 1c) of the coil bobbin 1. Hence, an oscillator can be provided which not only is simple in assembly and small in size, but also is strong for its size and is high in reliability of operation and durability. Moreover, there is the advantage of being usable with a simple driving circuit.

Figure 9:
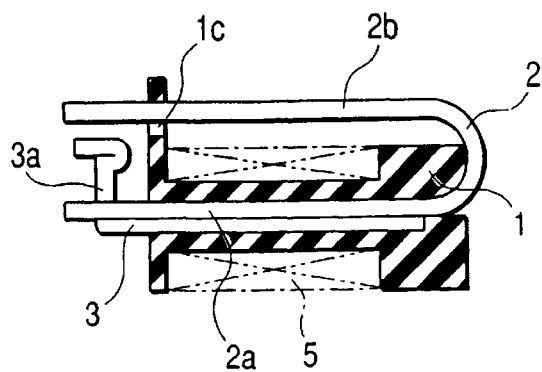
FIG. 9 is a view showing schematically the structure of a first modification example of the first embodiment.
Figure 10:
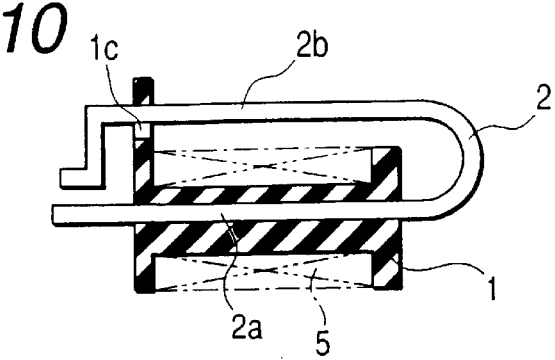
FIG. 10 is a view showing schematically the structure of a second modification example of the first embodiment.
Figure 11:
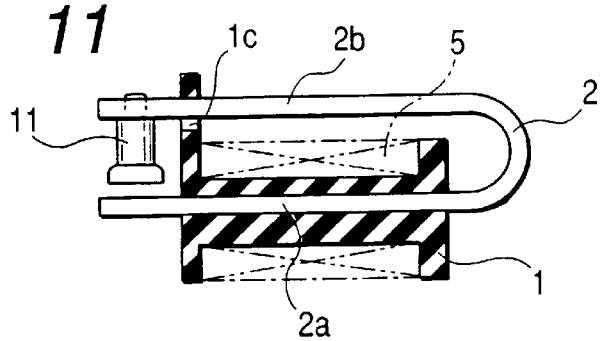
FIG. 11 is a view showing schematically the structure of a third modification example of the first embodiment.

FIGS. 9 to 11 show modification examples of the first embodiment which are different from one another. The modification example shown in FIG. 9 has the feature that the iron core 4 is eliminated and the top of the rising section 3a, that is, the attractive section, is designed so that the end of the iron core 3 can be bent double to enlarge the area of the attractive section and increase the flux linkage. The modification example of FIG. 10 has the feature that the one side 2a of the U-shaped movable iron piece 2 is also used as the iron core and the attractive section is configured by bending the top of the remaining side 2b of the movable iron piece 2 toward the one side 2a so that the structure is simplified. The modification example of FIG. 11 is characterized in that the one side 2a of the U-shaped movable iron piece 2 is also used as the iron core and the attractive section is constructed with an iron piece 11 fastened to the top of the remaining side 2b of the movable iron piece 2, for example, by a caulking technique, and configured to increase the flux linkage. In any of these modification examples, its structure and fundamental function and effect are the same as in the first embodiment, except for the above description, and thus their detailed explanation is omitted. In particular, each of the modification examples of FIGS. 10 and 11 has the advantage that further compactness can be achieved. The modification example of FIG. 10, instead of bending the top of the remaining side 2b of the U-shaped movable iron piece 2, may be designed to bend upward the top of the one side 2a. In the modification example of FIG. 11, the iron piece 11 may be fastened to the one side 2a of the U-shaped movable iron piece 2.

Figure 12:
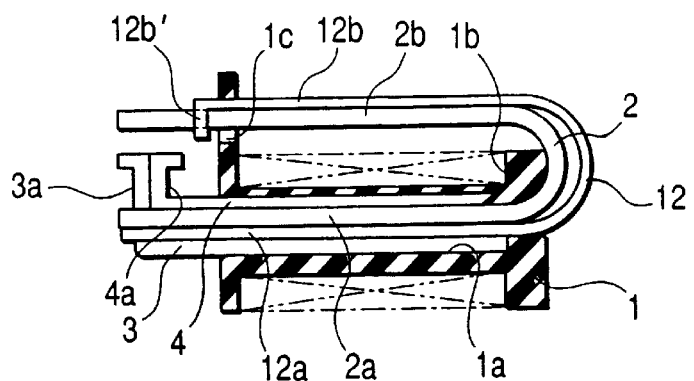
FIG. 12 is a view showing schematically the structure of a second embodiment of the electromagnetic device according to the present invention.

FIG. 12 shows the second embodiment of the present invention. In this figure, like numerals are used for like members and parts with respect to the first embodiment, and their detailed description is omitted. The second embodiment has the same structure as the first embodiment with the exception that the U-shaped movable iron piece 2 is magnetically annealed and a repulsive force of the remaining side 2b relative to the one side 2a is exerted by a U-shaped leaf spring 12 in which one side 12a is inserted in and fixed to the hollow section 1a of the coil bobbin 1, together with the one side 2a of the U-shaped movable iron piece 2 and the iron cores 3 and 4, while a remaining side 12b is provided along the movable iron piece 2 so as to have a resilient characteristic that the remaining side 12b is spaced away from the one side 12a, and a top 12b' is engaged with the remaining side 2b of the movable iron piece 2 by a proper known technique. The function and effect of the second embodiment are the same as in the first embodiment, and thus their explanation is omitted.

Figure 13:
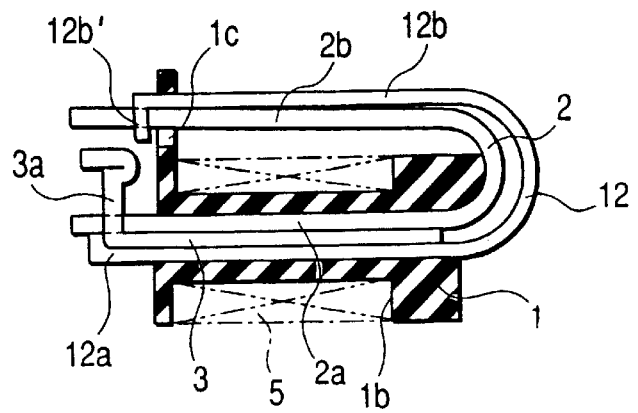
FIG. 13 is a view showing schematically the structure of a first modification example of the second embodiment.
Figure 14:
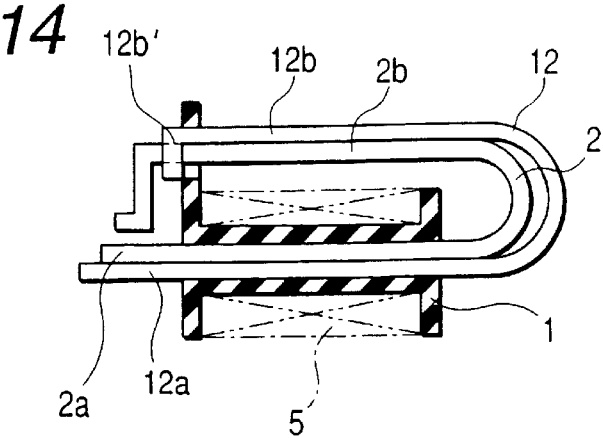
FIG. 14 is a view showing schematically the structure of a second modification example of the second embodiment.
Figure 15:
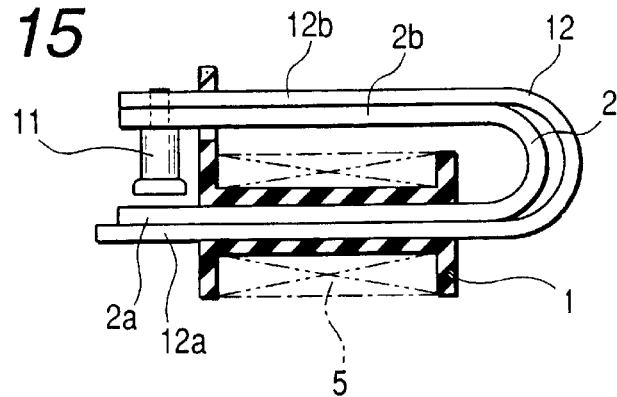
FIG. 15 is a view showing schematically the structure of a third modification example of the second embodiment.

FIGS. 13 to 15 show modification examples of the second embodiment which are different from one another. The modification example shown in FIG. 13 has the feature that the iron core 4 is eliminated and the top of the rising section 3a, that is, the attractive section, is designed so that the end of the iron core 3 is bent double to enlarge the area of the attractive section and increase the flux linkage. The modification example of FIG. 14 has the feature that the one side 2a of the U-shaped movable iron piece 2 is also used as the iron core and the attractive section is configured so that the top of the remaining side 2b of the movable iron piece 2 is bent in two steps toward the one side 2a to thereby increase the flux linkage, with the result that the structure is further simplified. The modification example of FIG. 15 is characterized in that the one side 2a of the U-shaped movable iron piece 2 is also used as the iron core and the attractive section is constructed with the iron piece 11 fastened to both the top of the remaining side 2b of the movable iron piece 2 and the top of the remaining side 12b of the U-shaped leaf spring 12, for example, by a caulking technique. In any of these modification examples, its structure and fundamental function and effect are the same as in the second embodiment, except for the above description, and thus their detailed explanation is omitted. The modification example of FIG.

14, instead of bending the top of the remaining side 2b of the U-shaped movable iron piece 2 in two steps, may be designed to bend upward the top of the one side 2a in the same manner. In the modification example of FIG. 15, the iron piece 11 may be fastened to both the one side 2a of the U-shaped movable iron piece 2 and the one side 12a of the U-shaped leaf spring 12.

Figure 16:
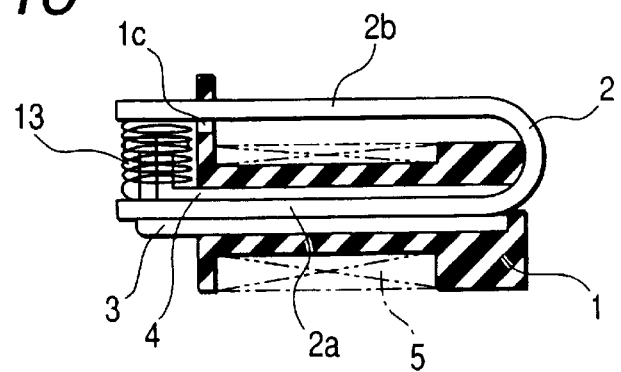
FIG. 16 is a view showing schematically the structure of a third embodiment of the electromagnetic device according to the present invention.
Figure 17:
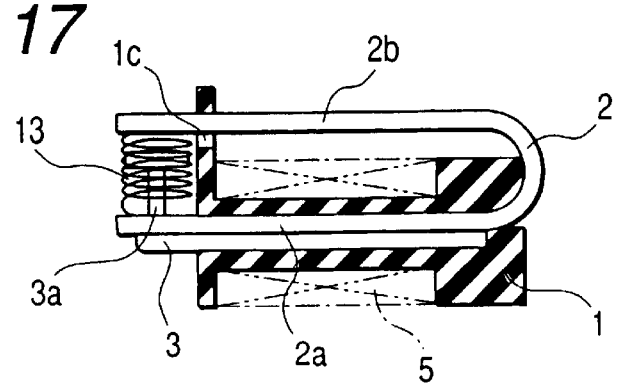
FIG. 17 is a view showing schematically the structure of a first modification example of the third embodiment.
Figure 18:
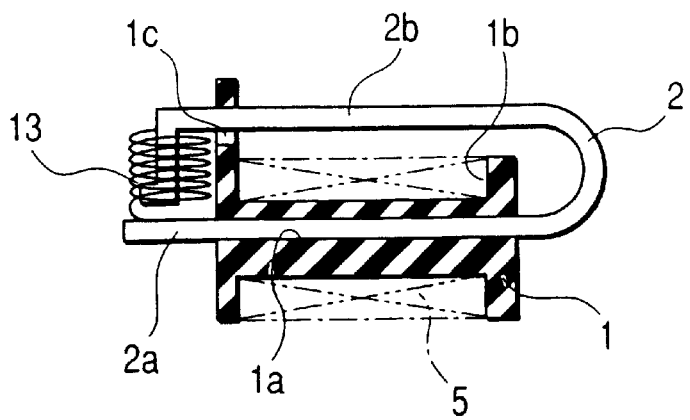
FIG. 18 is a view showing schematically the structure of a second modification example of the third embodiment.

FIG. 16 shows the third embodiment of the present invention. In this figure, like numerals are used for like members and parts with respect to the above embodiments and their detailed explanation is omitted. The third embodiment has the same structure as in the above embodiments with the exception that the U-shaped movable iron piece 2 is magnetically annealed and a repulsive force of the remaining side 2b relative to the one side 2a is exerted by a resilient member, for example, a coil spring 13 loosely wound around the rising sections 3a and 4a of the iron cores 3 and 4, interposed between the sides 2a and 2b. Since the third embodiment has the same function and effect as in the first embodiment with the exception of the feature that the assembly of the device is relatively simple, their explanation is omitted.

Figure 19:
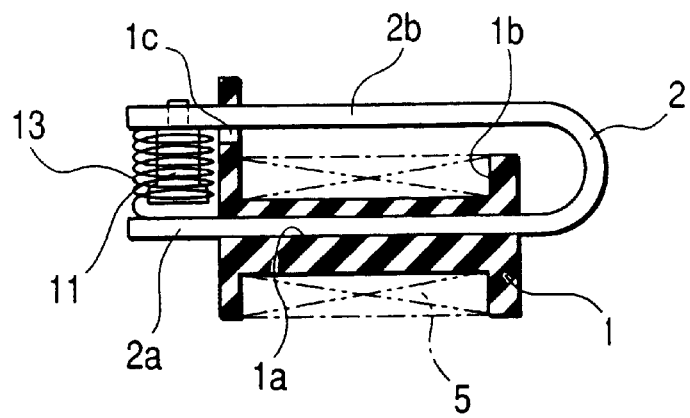
FIG. 19 is a view showing schematically the structure of a third modification example of the third embodiment.
Figure 20:
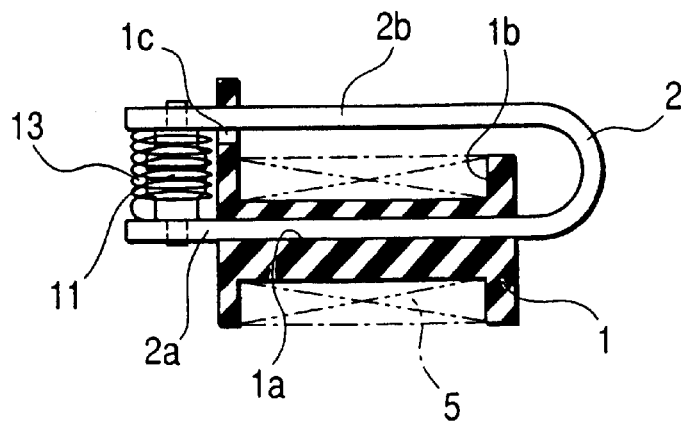
FIG. 20 is a view showing schematically the structure of a fourth modification example of the third embodiment.
Figure 21:
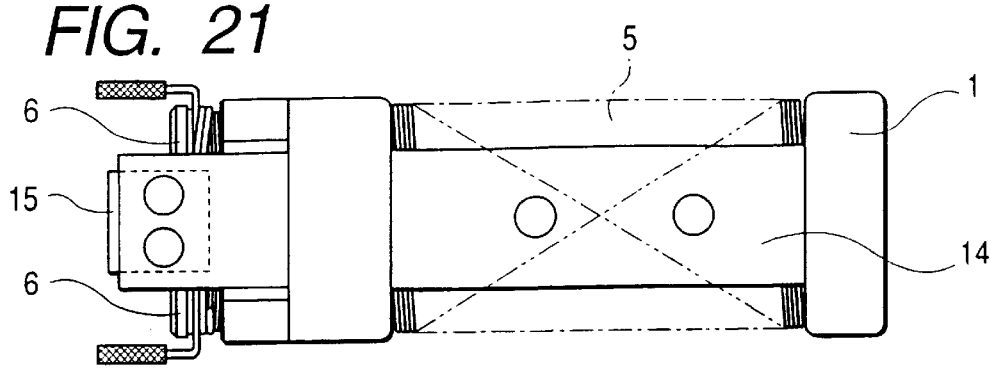
FIG. 21 is a plan view showing a fourth embodiment of the electromagnetic device according to the present invention.
Figure 22:
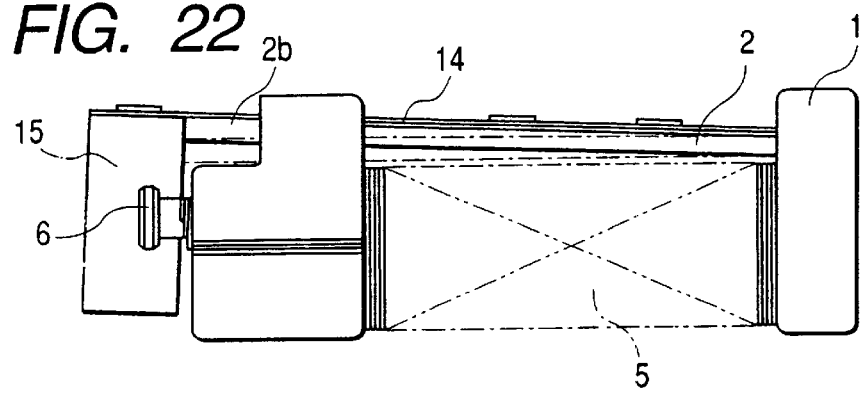
FIG. 22 is a side view showing the fourth embodiment.
Figure 23:
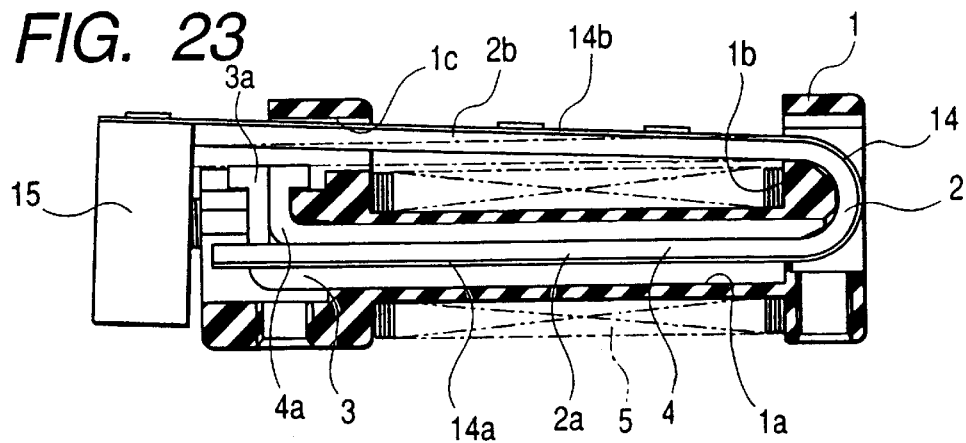
FIG. 23 is a longitudinal sectional view at the center, showing the fourth embodiment.
Figure 24:
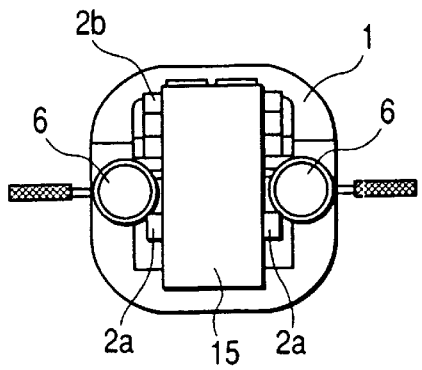
FIG. 24 is the left side view in FIG. 22.

FIGS. 17 to 20 show modification examples of the third embodiment which are different from one another. The modification example shown in FIG. 17 has the feature that the iron core 4 is eliminated and the top of the rising section 3a, that is, the attractive section, is designed so that the end of the iron core 3 is bent double to enlarge the area of the attractive section and increase the flux linkage. The modification example of FIG. 18 has the feature that the one side 2a of the U-shaped movable iron piece 2 is also used as the iron core, the attractive section is configured by bending the top of the remaining side 2b of the movable iron piece 2 in two steps toward the one side 2a to enable the flux linkage to be increased, and the coil spring 13 is wound around this bending section so that the structure is further simplified. The modification example of FIG. 19 is characterized in that the one side 2a of the U-shaped iron piece 2 is also used as the iron core and the attractive section is constructed with the iron piece 11 fastened to the top of the remaining side 2b of the movable iron piece 2, for example, by a caulking technique, so that the coil spring 13 is wound around the iron piece 11. The modification example of FIG. 20 is the same as that of FIG. 19 with the exception that another iron core 11 is also fastened to the top of the one side 2a of the U-shaped movable iron piece 2, for example, by a caulking technique, so as to be opposite to the iron core 11 of FIG. 19, and the coil spring 13 is wound around both the iron cores 11. In any of these modification examples, its structure and fundamental function and effect are the same as in the third embodiment, except for the above description, and thus their detailed explanation is omitted. Also, since the coil spring 13 is cited as an example of the resilient member, the present invention is not limited to this. The modification example of FIG. 18, instead of bending the top of the remaining side 2b of the U-shaped movable iron piece 2 in two steps, may be designed to bend upward the top of the one side 2a in the same manner. In the modification example of FIG. 19, the iron core 11 may also be designed so that it is fastened to the one side 2a of the U-shaped movable iron piece 2.

FIGS. 21 to 24 show the fourth embodiment of the present invention. In these figures, like numerals are used for like members and parts with respect to the above embodiments and their detailed explanation is omitted. The fourth embodiment is the same as any of the above embodiments with the exception that a highly flexible, thin U-shaped leaf spring 14 is provided which has one side 14a and a remaining side 14b along the U-shaped movable iron piece 2 constructed as in the first embodiment, except for the projection 2b', so that in particular, the base of the remaining side 14b is fastened to the remaining side 2b of the U-shaped movable iron piece 2, for example, by a caulking technique, and its top extends beyond the top of the remaining side 2b to attach a weight 15 thereto. The fourth embodiment is very effective in the case where it is utilized as the oscillator informing a user of the call of the portable telephone because when the remaining side 2b of the U-shaped movable iron piece 2 is moved by attraction and repulsion, the force of inertia caused by the weight 15 is imparted thereto and the amount of displacement, especially on repulsion, of the front end of the remaining side 14b of the U-shaped leaf spring 14 is increased.

As will be evident from the above description, electromagnetic pure iron steel plates or permalloy plates are used as materials of the U-shaped movable iron piece 2 and the iron cores 3 and 4. The experiment of the present applicant in the case where the electromagnetic device is used as the oscillator for the call of the portable telephone shows that when power consumption, oscillating excitation force, saturation flux density, and resilient force are taken into consideration, it is optimum that the magnetic path length governed by the U-shaped movable iron piece 2 and the iron cores 3 and 4 is in the range of 24–36 mm, the cross-sectional area of the movable iron piece 2 is 1.2–3.2 mm$^2$, and the cross-sectional area of each of the iron cores 3 and 4 is 2.4–3.6 mm$^2$.

Although the fourth embodiment has been described on the premise that the electromagnetic device is applied to the oscillator for the call of the portable telephone, the electromagnetic device is applicable to a reception-informing device in an electromagnetic switching apparatus or other communication apparatuses and to an electromagnetic driving application device. In particular, even a microminiature device can be constructed as a strong oscillator and in addition, so that the oscillation of the oscillation section is not propagated to a device body. Thus, the oscillator itself is held in the ear or on the periphery thereof and can be used like an earphone or a headphone. Various applications are possible.

INDUSTRIAL APPLICABILITY

As mentioned above, the electromagnetic device of the present invention, which is simple in structure and assembly and can be easily incorporated in an apparatus, is useful for practical use.

What is claimed is:

1. An electromagnetic device comprising:
    a coil bobbin supporting an excitation coil;
    a U-shaped iron piece constructed of a soft magnetic material, having one side being inserted through and fixed to said coil bobbin in a direction of an axis of said excitation coil and having a remaining side being bent from said one side to oppose to said one side and to have a resilient force acting so as to move away from said one side, and
    a pair of iron cores being inserted through and fixed to said coil bobbin so as to overlap on said one side of said U-shaped iron piece to add a magnetomotive force of said U-shaped iron piece to a magnetomotive force of said iron cores,
    one of said iron cores having a first rising section formed by bending one end portion thereof toward said remaining side of said U-shaped iron piece so that a flux linkage is increased, the other of said iron cores having a second rising section adjacent to said first rising section and formed by bending one end portion of the other of said iron cores toward said remaining side of said U-shaped iron piece so that said flux linkage is increased, said remaining side of said U-shaped iron piece being opposite to said first and second rising sections at a predetermined distance away, and said remaining side and the bent portion of said U-shaped iron piece being held movably against said resilient force of said remaining side of said U-shaped iron piece by a magnetomotive force of said excitation coil.

2. An electromagnetic device according to claim 1, further comprising an extension extending beyond the end of said remaining side of said U-shaped iron piece, and a weight fastened to said extension.

3. An electromagnetic device comprising:

a coil bobbin supporting an excitation coil;

a U-shaped iron piece constructed of a soft magnetic material, having one side being inserted through and fixed to said coil bobbin in a direction of an axis of said excitation coil and having a remaining side being bent from said one side to be opposite to said one side at a predetermined distance away;

a U-shaped leaf spring provided along said U-shaped iron piece and biasing said remaining side so as to be spaced away from said one side; and an iron core being inserted through and fixed to said coil bobbin so as to overlap on said one side of said U-shaped iron piece to add a magnetomotive force of said U-shaped iron piece to magnetomotive force of said iron core, said iron core having a rising section formed by bending one end portion thereof toward said remaining side of said U-shaped iron piece so that a flux linkage is increased, said remaining side of said U-shaped iron piece being opposite to said rising section of said iron core at a predetermined distance away, and said remaining side and the bent portion of said U-shaped iron piece being held movably against a biasing force of said U-shaped leaf spring by said coil bobbin so as to be displaceable, together with said U-shaped iron piece, against a magnetomotive force of said excitation coil.

4. An electromagnetic device comprising:

a coil bobbin supporting an excitation coil;

a U-shaped iron piece constructed of a soft magnetic material, having one side being inserted through and fixed to said coil bobbin and having a remaining side being bent from said one side to be opposite to said one side at a predetermined distance away;

an iron core being inserted through and fixed to said coil bobbin so as to overlap on said one side of said U-shaped iron piece to add a magnetomotive force of said U-shaped iron piece to magnetomotive force of said iron core; and a resilient member being interposed between opposite sides of said U-shaped iron piece and pressing said opposite sides so that said opposite sides are spaced away from each other, one of said iron core having a rising section formed by bending one end portion thereof toward said remaining side of said U-shaped iron piece so that a flux linkage is increased, said remaining side of said U-shaped iron piece being opposite to said rising portion of said iron core at a predetermined distance away, and said remaining side and the bent portion of said U-shaped iron piece being held movably against a resilient force of said resilient member by a magnetomotive force of said excitation coil.

5. An electromagnetic device according to any one of claims 1–4, wherein a top of at least one of opposite sides of said U-shaped iron piece is bent toward said remaining side of said U-shaped iron piece so that a flux linkage is increased.

6. An electromagnetic device according to any one of claims 1–4, wherein an iron piece is fastened to at least one of opposite sides of said U-shaped iron piece and is configured to project toward said remaining side of said U-shaped iron piece so that a flux linkage is increased.

7. An electromagnetic device comprising:

a coil bobbin supporting an excitation coil;

a U-shaped iron piece constructed of a soft magnetic material, having one side being inserted through and fixed to said coil bobbin and having a remaining side being bent from said one side to be opposite to said one side at a predetermined distance away; and an iron core being inserted through and fixed to said coil bobbin so as to overlap on said one side of said U-shaped iron piece to add a magnetomotive force of said U-shaped iron piece to a magnetomotive force of said iron core;

said iron core having a rising section formed by bending one end portion thereof toward said remaining side of said U-shaped iron piece so that a flux linkage is increased, said remaining side of said U-shaped iron piece being opposite to said rising section of said iron core at a predetermined distance away, and said remaining side and the bent portion of said U-shaped iron piece being held movably against said resilient force of said remaining side of said U-shaped iron piece by a magnetomotive force of said excitation coil.

8. An electromagnetic device according to any one of claims 3, 4 and 7, wherein a top surface of said rising section is configured by bending said rising section.

9. An electromagnetic device according to claim 1, wherein a selection is made so that a magnetic path length determined by said U-shaped iron piece and iron cores is 24–36 mm, a cross-sectional area of said U-shaped iron piece is 1.2–3.2 mm$^2$, and a cross-sectional area of each of said iron cores is 2.4–3.6 mm$^2$.

10. An electromagnetic device according to any one of claims 1, 3, 4 and 7 wherein a series circuit including a normally open switch closed for a preset time by a reception of a call signal, a power supply, and a current-pulse circuit is connected in series with said excitation coil.

11. An electromagnetic device according to claim 10, wherein an arithmetical unit is connected to said current-pulse circuit so that said arithmetical unit is capable of controlling at least one of a conduction time, a conduction period, and a conduction duration of a pulse current supplied from said current-pulse circuit to said excitation coil.

12. An electromagnetic device according to claim 7, further comprising an extension extending beyond the end of said remaining side of said U-shaped iron piece, and a weight fastened to said extension.

* * * * *